United States Patent [19]

Kennerly et al.

[11] 4,364,269

[45] Dec. 21, 1982

[54] FLOWMETER FOR DETERMINING AVERAGE RATE OF FLOW OF LIQUID IN A CONDUIT

[75] Inventors: John M. Kennerly, Knoxville; Gordon M. Lindner; John C. Rowe, both of Oak Ridge, all of Tenn.

[73] Assignee: The United States of America as represented by the United States Department of Energy, Washington, D.C.

[21] Appl. No.: 258,971

[22] Filed: Apr. 30, 1981

[51] Int. Cl.³ ............................................... G01F 3/38
[52] U.S. Cl. ........................................ 73/223; 73/200
[58] Field of Search .............. 73/3, 200, 219, 223–226

[56] References Cited

U.S. PATENT DOCUMENTS

| | | | |
|---|---|---|---|
| 2,069,990 | 2/1937 | Bjork et al. | 73/200 |
| 2,325,695 | 8/1943 | McAfee | 73/219 |
| 3,125,881 | 3/1964 | Peters et al. | 73/223 |
| 3,177,699 | 4/1965 | Lindquist et al. | 73/3 |
| 3,279,379 | 10/1966 | Klyce | 73/304 X |

*Primary Examiner*—Charles A. Ruehl
*Attorney, Agent, or Firm*—Fred O. Lewis; Stephen D. Hamel; Richard G. Besha

[57] ABSTRACT

This invention is a compact, precise, and relatively simple device for use in determining the average rate of flow of a liquid through a conduit. The liquid may be turbulent and contain bubbles of gas. In a preferred embodiment, the flowmeter includes an electrical circuit and a flow vessel which is connected as a segment of the conduit conveying the liquid. The vessel is provided with a valved outlet and is partitioned by a vertical baffle into coaxial chambers whose upper regions are vented to permit the escape of gas. The inner chamber receives turbulent downflowing liquid from the conduit and is sized to operate at a lower pressure than the conduit, thus promoting evolution of gas from the liquid. Lower zones of the two chambers are interconnected so that the downflowing liquid establishes liquid levels in both chambers. The liquid level in the outer chamber is comparatively calm, being to a large extent isolated from the turbulence in the inner chamber once the liquid in the outer chamber has risen above the liquid-introduction zone for that chamber. Lower and upper probes are provided in the outer chamber for sensing the liquid level therein at points above its liquid-introduction zone. An electrical circuit is connected to the probes to display the time required for the liquid level in the outer chamber to successively contact the lower and upper probes. The average rate of flow through the conduit can be determined from the above-mentioned time and the vessel volume filled by the liquid during that time.

10 Claims, 2 Drawing Figures

FLOWMETER FOR DETERMINING AVERAGE RATE OF FLOW OF LIQUID IN A CONDUIT

The invention was made as a result of a contract with the United States Department of Energy.

BACKGROUND OF THE INVENTION

1. Field of the Invention

This invention relates generally to in-line total-flow meters for liquids. More particularly, it relates to apparatus for use in rapidly and precisely metering the average rate of flow of a liquid in a conduit. As used herein, the term "liquid" includes single-component liquid systems, liquid solutions, liquids containing particles and/or gas bubbles, and the like.

2. Problem

This invention was made in response to a need for improved apparatus for periodically determining the rate of flow of an aqueous liquid through a conduit. The liquid was hot, corrosive, and electrically conductive; it contained entrained gas in the form of many tiny bubbles. The primary reasons for making the determination were to establish whether the flow through the conduit was at design value and, if not, to measure the deviation from that value and take corrective action. Previously, the flow rate of the liquid has been measured by valving the flow from the conduit into a calibrated volume, determining with a stopwatch the time required to fill the volume, and then calculating the corresponding average flow rate. That procedure was subject to serious disadvantages, including the following: (1) Diverting the liquid as described changed the upstream flow conditions, thus altering the flow rate under measurement. (2) The diverted liquid could not be returned to the conduit for use but instead had to be discarded as waste. (3) Diversion of the liquid from the conduit was potentially hazardous. As an alternative, various commercial flowmeters were tested as means for measuring the flow rate of the liquid, but none was entirely satisfactory. The most suitable of these, a magnetic flowmeter, did not perform satisfactorily because of the bubbles of gas in the liquid. The provision of debubbler did not improve operation of the flowmeter appreciably.

SUMMARY OF THE INVENTION

Objects

Accordingly, it is an object of this invention to provide novel flow-metering apparatus for liquids.

It is another object to provide an in-line total-flow meter which temporarily stores liquid discharged from a conduit without altering upstream flow conditions in the conduit.

It is another object to provide an in-line flowmeter apparatus for use in determining the average rate of flow of a liquid stream containing bubbles of gas.

It is another object to provide a compact in-line flowmeter for accumulating a rapidly introduced liquid and accurately determining the volume of the accumulated liquid despite turbulence of the liquid.

SUMMARY

This invention relates to apparatus for use in determining the average rate of flow of a liquid through a conduit. In one aspect, the invention includes a vessel which is partitioned by a generally vertically extending baffle into first and second chambers, each of which is provided with means for venting gas from an upper portion thereof. The first chamber is arranged to receive the above-mentioned liquid from the conduit as a downflowing stream and has a cross-sectional area exceeding that of the stream. A lower zone of the first chamber is in communication with a lower zone of the second chamber to permit the received liquid to establish liquid levels in both chambers. The second chamber (liquid-calming chamber) contains lower and upper probes for sensing the liquid level therein as respective point above the aforementioned lower zone of that chamber. Means are connected to the probes for generating an output indicative of the time required for the liquid level in the second chamber to successively contact the lower and upper probes.

In another aspect, the apparatus for use in determining the average rate of flow through a conduit includes a vessel which is connected as a vertically extending segment of the conduit. The vessel has a bottom outlet containing a block valve and is partitioned by a generally vertical tubular baffle into an inner chamber and an outer chamber. The inner chamber receives a downflowing stream of liquid from the conduit and retains the liquid when the valve is closed. The upper portion of each chamber is provided with means for venting gas, and the inner chamber has a cross-sectional area exceeding that of the received stream. The chambers have lower zones which are in communication to permit the retained liquid to establish liquid levels in both chambers. Lower and upper probes in the outer chamber, respectively, sense lower and upper liquid levels in that chamber at points above the aforementioned lower zone thereof. Means are provided for selectively opening and closing the valve. The aforementioned probes are connected to means for generating an output indicative of the time required for liquid accumulating in the outer chamber to successively contact the lower and upper probes.

The drawings are not to scale.

DETAILED DESCRIPTION OF THE INVENTION

Figure 2:
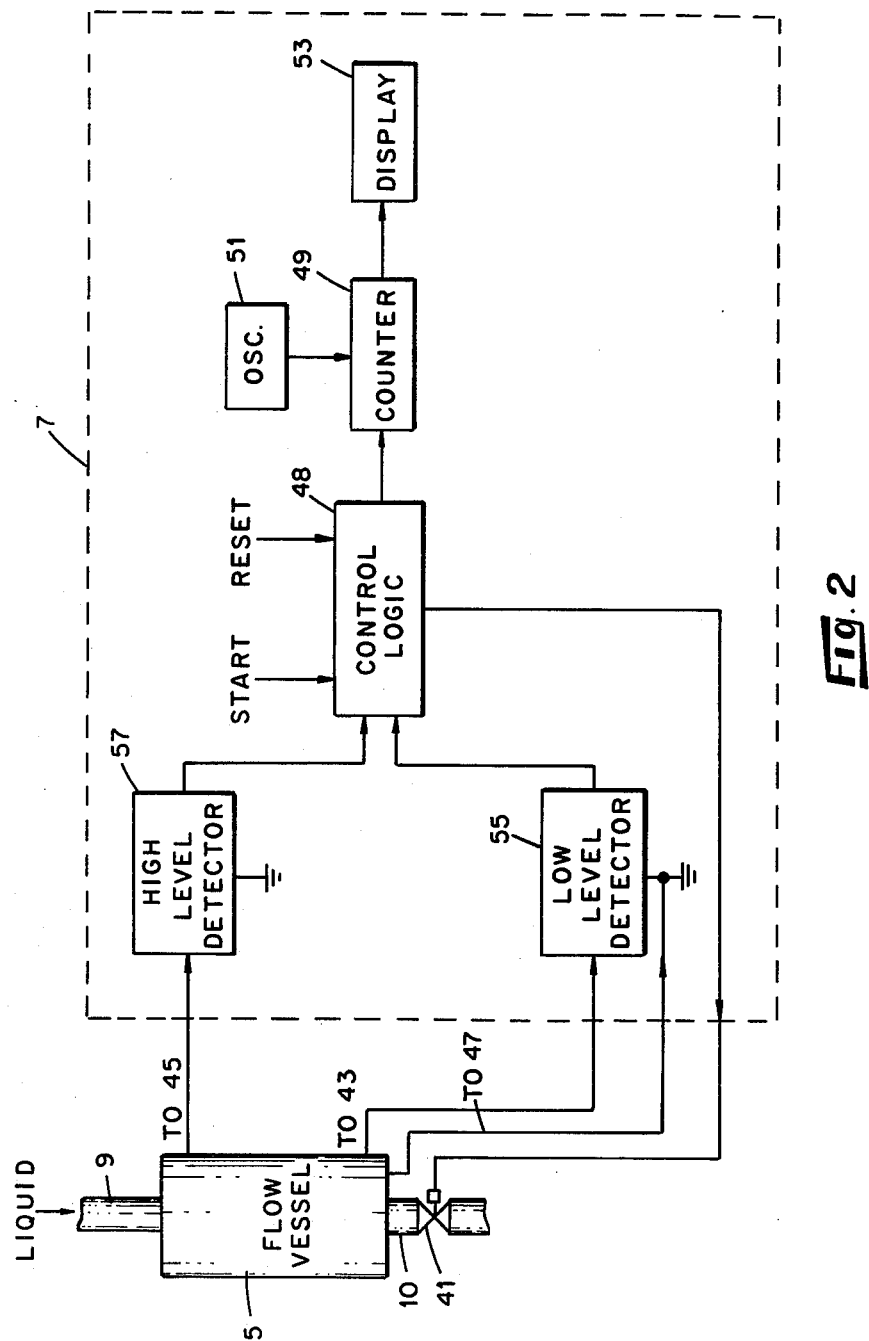
FIG. 2 is a block diagram of the vessel 5 as connected to an auxiliary electrical circuit 7, both designed to accomplish the purposes of the invention.

Referring to the drawings, the preferred embodiment of our flowmeter includes a vessel 5 and an auxiliary grounded electrical circuit 7 (FIG. 2). The vessel, which is of elongated cylindrical shape and is designed to operate in the vertical position, is connected to serve as a segment of a conduit conveying the liquid whose flow rate is to be measured. That is, during non-metering periods the vessel receives all of the outflow from an upstream line 9 and directs it into downstream line 10 with essentially no hold-up. In the description which follows, the flow in the conduit is exemplified by a hot, corrosive, electrically conductive liquid containing many tiny bubbles of gas.

Figure 1:
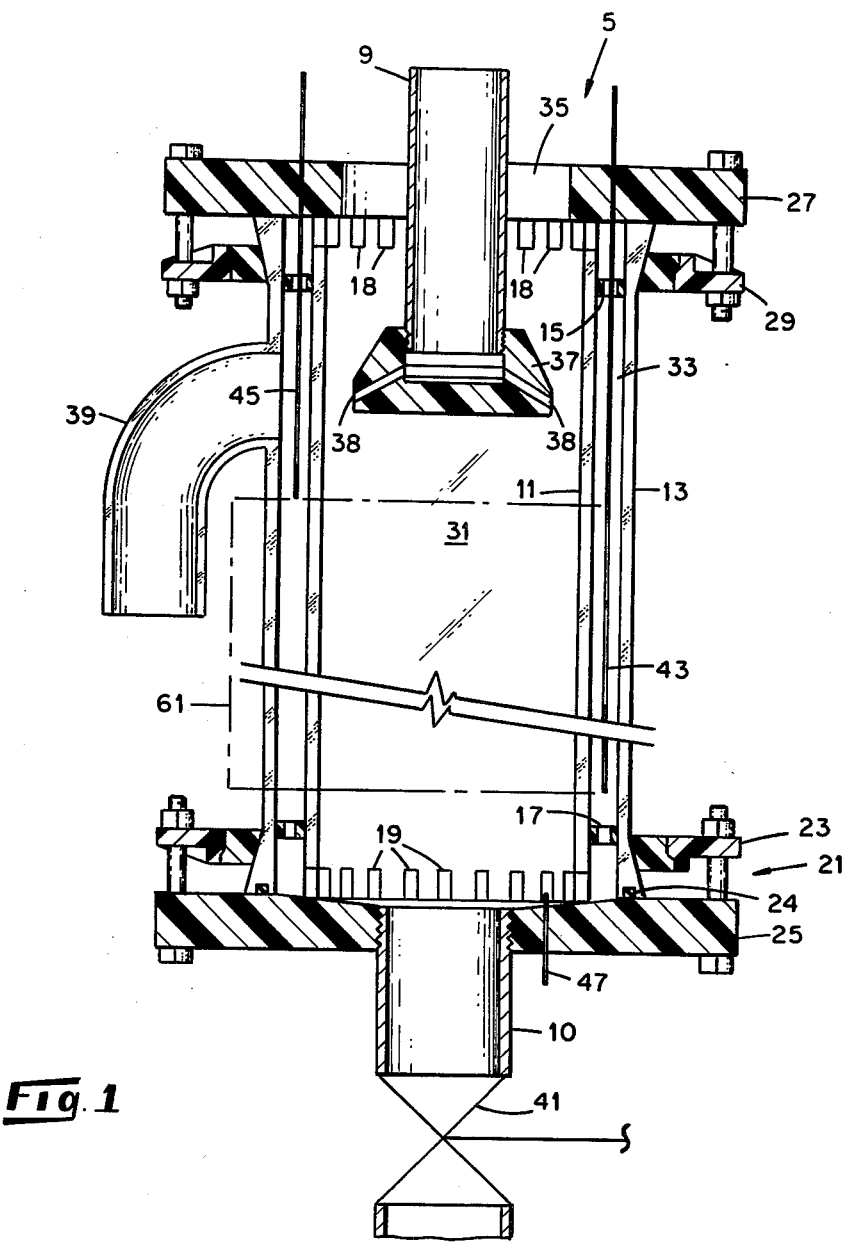
FIG. 1 is a longitudinal section of a dual-chambered vessel 5 designed in accordance with this invention.

Referring to FIG. 1, the vessel 5 comprises concentric tubes 11 and 13, which are separated by annular perforated spacers 15 and 17. As shown, the cross-sectional area of the inner tube is made larger than that of the line 9. The upper and lower end portions of the inner tube 11 are formed with respective sets of openings 18 and 19; the end portions of outer tube 13 are flared as shown. The tube assembly is mounted to be in axial alignment with downstream line 10 and is secured in this position by a bolted-flange arrangement 21. This includes a flange 23 which bears on the flanged portion of tube 13 and is bolted to a flange 25 threaded onto line 10. A sealing ring 24 is clamped between the mating faces of tube 13 and flange 25 to provide a leaktight bottom assembly. The upper face of the flange 25 is sloped to promote rapid and complete drainage of the trapped liquid at the end of a metering operation.

The upper ends of tubes 11 and 13 are clamped by a generally similar flange arrangement including upper and lower flanges 27 and 29, respectively. Thus, the vessel 5 includes (a) an inner chamber 31 defined by the tube 11 and flanges 25, 27 and (b) an annular outer chamber 33 defined by the tubes 11, 13 and flanges 25, 27. As shown, the central portion of upper flange 27 is open to permit upstream line 9 to extend axially within the inner chamber. Line 9 and flange 27 define an annular gap 35 for venting gas from the flowmeter chambers to atmospheres, to prevent buildup of backpressure as they fill with liquid. The outer chamber 33 communicates with gap 35 through the openings 18. As shown, line 9 terminates in an annular nozzle 37 for directing the received liquid against the wall of the inner chamber 31 to reduce turbulence in the liquid accumulating therein when a valve 41 is closed. The nozzle is formed with a frusto-conical outlet 38. The outer chamber 33 is provided with a vent 39 for liquid overflow, in the event an electrically operated block valve 41 (mounted in downstream line 10) fails to open on command. Electrical-conductivity probes 43 and 45 extend into the outer chamber 33 through openings in the flange 27 and spacer 15 to sense when liquid accumulating in that chamber reaches selected lower and upper levels, respectively. The spacing between the probes and adjacent walls is sufficient to prevent bridging of the liquid. A third conductivity probe 47 extends into the bottom zone of inner chamber 31 and serves as the electrical common in a probe circuit, to be described.

Referring to FIG. 2, a manually energized electrical circuit 7 is connected to the valve 41 and across the probes 43, 45, and 47. The principal functions of circuit 7 are to (a) close valve 41 to initiate a metering operation; (b) open the valve when liquid in vessel 5 contacts the upper probe 45; (c) generate a pulse count proportional to the time interval required for the liquid accumulating in vessel 5 to successively contact the probes 43 and 45; and (d) display the elapsed-time interval. (Alternatively, the corresponding average rate of flow may be displayed.)

As shown, circuit 7 includes control-logic circuitry 48. In a normal operation of the flowmeter, an operator manually energizes circuit 48 to effect closing of the valve 41. As a result, the liquid discharged from line 9 accumulates and contacts lower probe 43. As mentioned, the inner and outer chambers 31 and 33, respectively, are in restricted communication through flow paths including the vents 19 and perforations in spacer 17. Preferably, the flow paths are sized so that the liquid levels in the two chambers rise substantially in unison. The liquid level in the inner chamber is relatively turbulent, however, because of disturbances produced by incoming liquid flowing rapidly down the inside wall of the chamber. In contrast, once the liquid level in the outer chamber 33 is above the level of the openings 19, it is substantially isolated from such disturbances and is relatively calm. Consequently, its position can be determined accurately by the probes 43 and 45, both of which are disposed well above the vents.

The upper probe 45 sets a limit to the buildup of liquid in vessel 5, so that the accumulating liquid does not contact the liquid-dispensing nozzle 31 or reach the overflow vent 45. As a result, upstream line 9 is isolated from the liquid buildup in chamber 31, and operation of the flowmeter does not alter the flow rate upstream of the vessel—i.e., the upstream flow is hydraulically isolated from the flowmeter. Also, the flowmeter is designed to ensure removal of an appreciable fraction of the gas entrained in the incoming liquid. This is achieved by designing the inner chamber 31 with a larger inside diameter and volume than the discharge end of line 9, so that the chamber is at a lower pressure than the line. Thus, entrained gas escapes from the liquid as the latter flows down the wall of chamber 31. The gas so released is vented through the annular gap 35. As a result, the liquid entering the sensing chamber 33 contains fewer gas bubbles.

When the electrically conductive liquid accumulating in vessel 5 contacts the lower probe 43, current flow is established through a circuit including the detector probe, the liquid, common probe 47, and a low-level detector circuit 55. In response, the detector 55 output logic level goes high and the control logic actuates a counter 49 to start counting pulses generated by an oscillator 51. The output from the counter is fed to a circuit 53 for displaying the time elapsing between actuation of probe 43 and probe 45. When the liquid contacts the upper probe, a high-level detector 57 signals the control logic in a similar manner, with the result that counting is discontinued, valve 41 is opened to release the stored liquid, and the time interval corresponding to the count is retained in the display 53. In addition to sequencing the start and stop of operations, the control logic interlocks the control switches available to the operator so that incorrect readings cannot occur due to such things as initiating a measurement with a partially full column or resetting the readout during a measurement. An indicator light (not shown) is activated during a measurement to show that a reading is in progress.

EXAMPLE

A flowmeter of the kind shown in FIGS. 1 and 2 was connected in a conduit carrying a liquid of the kind referred to above. At intervals, the flowmeter was actuated and used to determine the time required for liquid trapped in the vessel 5 to successively contact probes 43 and 45. The average flow rate through the conduit then was calculated, based on that time and the volume of zone 61 (FIG. 2) of the vessel 5. Extensive tests established that the flowmeter operated with a precision of better than 0.2%. The typical metering operation required less than 60 seconds (time elapsing between closing and opening of the valve 41), and the total amount of liquid accumulating in the vessel 5 during this period was 14.200 cc. The flowmeter met design requirements and overcame the disadvantages of the previously used technique (see "Problem", above). It was determined by visual observation that the liquid levels in chambers 31 and 33 rose substantially in unison and that the liquid level in chamber 33 was essentially turbulence-free.

In the tests just referred to, the tubes 11 and 13 were composed of Pyrex glass and had a length of 48". Each end of tube 11 was provided with 18 equally spaced slots (18,19) each having an area of ⅛ in². Tube 11 had an inside diameter of 4.75" and an outside diameter of 5". The outer chamber 33 had a width of 0.50". The probes 43 and 45 were composed of stainless steel and, excepting their tips, were coated with Teflon. The lower probe extended to within 6" of the bottom of chamber 33; the upper probe, to within 39". Each of the spacers 15, 17 was provided with 18 equally spaced perforations, each perforation having a diameter of ⅜". The flanges, spacers, and nozzle 37 were composed of Teflon. The line 9 had an inside diameter of 1.5". The nozzle 37 was formed of upper and lower sections defining the above-mentioned flow passage 38 (width, 3/16"). The skirt of the nozzle was spaced ⅝" from the tube 11. Valve 41 was a standard solenoid valve.

Referring to the circuit 7 used in the tests, the detectors utilized an integrated circuit, Model No. LM1830, manufactured by National Semiconductor Company. The logic circuit 48 utilized standard cmos logic chips. The oscillator 51 included a 1 MHz crystal and a 4049 cmos integrated circuit, followed by a divider circuit consisting of 4 cmos 4017 integrated circuits. The counter was Model ZN1040E, manufactured by Ferranti Electric, Inc.

The foregoing description of a preferred embodiment of the invention has been presented for the purposes of illustration and description. It is not intended to limit the invention to the particular liquid cited or to the precise form disclosed. Obviously, many modifications and variations are possible in the light of the foregoing teaching. It will be apparent to one versed in the art that the chambers 31 and 33 may be receptacles of various configurations and sizes and may be disposed in various arrangements, consistent with achieving the purposes of the invention. For example, the inner tube 11 may be suspended from its upper end, with its lower end defining an annular gap with the flange 25, the gap serving the function of the openings 19. As another instance, the spacers 15, 17 may be eliminated. Again, the probes 43 and 45 may be replaced with other known types of probes, such as sonic or optical probes, which permit use with non-conducting liquids; suitable conventional means responsive ot the outputs of the probes would be provided to generate the desired display. The probes 43 and 45 may be mounted in any suitable fashion; for instance, they may extend into the chamber 33 through the wall of tube 13. If desired, the flowmeter may be operated under above-atmospheric or below-atmospheric conditions; Instead of being vented to atmosphere, the gap 35 may be vented to any suitable gas receiver. In the event the flowmeter is designed so that the liquid level in the outer chamber lags the level in the inner chamber, the circuitry 7 may be calibrated to compensate for the lag.

It is intended that the scope of the invention be defined by the appended claims.

What is claimed is:

1. Apparatus for use in determining the average rate of flow of a liquid through a conduit, comprising:
    a vessel partitioned by a generally vertically extending baffle into first and second liquid-storage chambers, each provided with means for venting gas from the upper portion thereof, the first chamber arranged to receive said liquid from said conduit as a downflowing stream and having a cross-sectional area exceeding that of the received stream of liquid, the first chamber having a lower zone thereof in fluid communication with a lower zone of the second chamber to permit liquid so received to establish liquid levels in both of said chambers,
    a lower probe and an upper probe in the second chamber for respectively sensing the liquid level therein at points above said lower zone thereof, and
    means connected to the probes for generating an output indicative of the time required for the liquid level in the second chamber to successively contact said lower probe and said upper probe.

2. The apparatus of claim 1 wherein said probes are electrically conductive.

3. The apparatus of claim 2 wherein said means is an electrical circuit.

4. The apparatus of claim 1 wherein said baffle is tubular.

5. The apparatus of claim 1 further including means for directing said downwardly flowing stream against the inside wall of the first chamber.

6. The apparatus of claim 1 wherein the first chamber has a larger volume that the second chamber.

7. Apparatus for use in determining the average rate of flow of a liquid through a conduit, comprising:
    a vessel disposed as a vertically extending segment of said conduit and having a bottom outlet containing a block valve, said vessel including a generally vertical tubular baffle for partitioning the vessel into (1) an inner chamber for receiving a downflowing stream of liquid from said conduit and retaining the same when said valve is closed, and (2) an outer chamber, each of the chambers being provided with means for venting gas from the upper portion thereof, the inner chamber having an inside cross-sectional area exceeding that of said stream and having a lower zone in communication with a lower zone of the outer chamber to permit retained liquid to establish liquid levels in both of the chambers,
    lower and upper probes in the outer chamber for respectively sensing lower and upper liquid levels therein at points above said lower zone of the outer chamber,
    means connected to said probes for generating an output indicative of the time required for liquid accumulating in the outer chamber to successively contact said lower and upper probes.

8. The apparatus of claim 7 wherein the liquid levels in the interconnected chambers rise substantially in unison.

9. The apparatus of claim 7 wherein said downflowing stream of liquid is passed through means directing the liquid against the inside wall of the inner chamber.

10. The apparatus of claim 7 wherein the outer chamber has a smaller cross-sectional area than the inner chamber.

* * * * *